Aug. 11, 1964  T. R. WHITNEY  3,144,554
RADIANT ENERGY DETECTION SYSTEM FOR SUPPRESSING
THE EFFECTS OF AMBIENT BACKGROUND RADIATION
Filed Oct. 1, 1959  2 Sheets-Sheet 1

THEODORE R. WHITNEY
INVENTOR.

BY
ATTORNEY

THEODORE R. WHITNEY
INVENTOR.

BY

ATTORNEY

3,144,554
RADIANT ENERGY DETECTION SYSTEM FOR SUPPRESSING THE EFFECTS OF AMBIENT BACKGROUND RADIATION

Theodore R. Whitney, Woodland Hills, Calif., assignor, by mesne assignments, to The Bunker-Ramo Corporation, Canoga Park, Calif., a corporation of Maryland
Filed Oct. 1, 1959, Ser. No. 844,814
10 Claims. (Cl. 250—83.3)

This invention relates to radiant energy detection systems and more particularly to a new and improved radiation detection system for suppressing the effects of ambient background radiation.

In the co-pending United States patent application entitled "Energy Detection System," Serial No. 835,814, filed August 19, 1959, in which I am co-inventor with Howard Williams, there is described a system in which the effects of ambient background radiation, appearing along with target energy, may be substantially minimized through a generation of electrical signals representing received energy falling within separate spectral bands which are combined in such a way as to secure an output signal representing target radiation substantially free of the effects of background radiation. The present invention is directed to an improved system of the same general type but in which a larger target signal may be secured through a better utilization of the received radiant energy with the effects of background radiation being suppressed in two separate channels to produce two separate target energy signals which are combined as an output signal. Before considering the details of the present invention and the manner in which it may be employed to advantage, a brief discussion of radiant detection systems generally will be given in order that a better understanding of the invention and an appreciation of its exemplary characteristics may be had.

In the prior art, numerous systems utilizing combination of chopping reticles and energy sensitive cells have been disclosed for detecting and determining the position of bodies from which are emanating some form of detectable energy such as light, heat or radio frequency waves. A number of the prior art systems have afforded considerable sensitivity and accuracy in the detection of such bodies. However, especially in the field of visible or infrared target detection, there exists considerable need for improving the sensitivity and response speed of such systems so as to afford improved means for detecting and/or tracking moving bodies, objects or targets such as modern supersonic aircraft, missile and rockets, especially under conditions where such targets appear against backgrounds from which, in turn, emanate considerable energy.

As will appear hereinafter, although the novel apparatus of the present invention finds particularly useful application in detection systems responsive to electromagnetic radiation falling within the infrared spectrum, the novel features of the present invention are also of advantage in radiant energy detection systems based upon the detection of other forms of radiant energy such as visible and invisible light rays. To this end, the term "optical," often employed as descriptive of visible light processing systems, will, as used in this specification, be construed as being also descriptive of systems for collecting, directing, refracting, transducing and detecting radiant energy other than that constituting visible light. Likewise, where hereinafter there are given examples of operating principles underlying the prior art and the improvements thereover offered by the present invention, in terms of a specific form of radiant energy such as infrared, such operating principles will be understood to have potential usefulness in systems responsive to other forms of radiant energy.

In order to best understand the present invention and the general problem to which it is directed, consideration will first be given to certain basic features of some prior art optical detection systems. In most prior art optical detection systems employed for detecting and determining the position of a target with respect to a given point of observation, the space in which it is suspected that an energy-emanating target may be present is systematically examined by an optical type energy-collection apparatus. Such as energy collection apparatus generally employs combination of mirrors and/or lenses and is designed to be responsive on a selective basis to only that energy which is collected within a given angular field of view. The response pattern of such apparatus is generally representable as a solid cone extending into space, with the apex of the cone positioned at the given point of observation. This angular field of view, or response pattern, is generally referred to as the "instantaneous field of view" or sometimes "field of view" of the collection apparatus. The optical axis of the collection apparatus, as projected into space, is, in most cases, centrally disposed within this instantaneous field of view so that the optical axis of the collection apparatus is in geometric coincidence with the axis of the conical response pattern of the apparatus.

The energy collected within the instantaneous field of view of the collection apparatus is directed to an energy sensitive cell which develops an electrical output potential or signal, the magnitude of which represents the intensity of the total radiant energy collected within the field of view. This total energy includes that which emanates from the target per se as well as background radiation energy, such as may emanate from the sky, clouds, water, etc., against which the target may appear. In accordance with prior art techniques, it is common to find that a circular, disc-like, "chopping reticle" is positioned within the energy collection apparatus at an image or focal plane therein. Such a reticle is rotated about its axis in interrupting relation to the total radiation collected by the apparatus so as to "chop" the radiation as it is directed to the sensitive cell. This type of reticle or episcotister is generally called a "chopping" reticle because it is comprised of a pattern of carefully dimensioned alternate areas of relative opacity and transmissivity to the energy or radiation collected by the apparatus. The shape of each of these areas often conforms to that of a sector of a circle. The areas of relative transmissivity, defined between adjacent areas of relative opacity on the reticle pattern, are sometimes called "reticle apertures" because it is through these openings, or apertures, that radiant energy is permitted to reach the energy sensitive cell.

It has been the practice to align the rotational axis of the reticle with the optical axis of the collection apparatus, at an image or focal plane therein, so as to focus or "image" the instantaneous field of view on the reticle pattern. The field of view, as imaged on the reticle, is generally referred to as the "imaged field of view."

In prior art systems employing such chopping reticles, the reticle is rotated, about its axis, at a selected angular velocity. As it rotates, the reticle apertures move within the image field of view and modulate the energy reaching the energy sensitive cell.

As a consequence, the cell then produces an output signal having a direct current component which is a direct function of the average value of energy reaching it. The cell output signal also generally has included in it a plurality of alternating current harmonically related modulation components, the largest and fundamental alternating current modulation component having a frequency which is termed the "chopping frequency" of the reticle. This fundamental alternating current component is sometimes called the "carrier" component of the cell output signal and is of a frequency value directly proportional to both the number of reticle apertures and the rotational velocity of the reticle.

In practice, target "surveillance," that is the detection of, position determination of, and the following of a given moving target with apparatus employing a chopping reticle is accomplished in two steps, usually termed "search" and "track," respectively. First, in search, the entire collection apparatus is mechanically driven to execute a systematic scanning action which results in the exploratory examination of a volume of space which is many times greater than the instantaneous field of view subtended by the collection apparatus and, in which volume of space, it is suspected that an energy radiating target may be present. The output signal from the energy-sensitive cell is oftentimes recorded or stored, on a memory basis, as the search action proceeds. Thus, during or after completion of the search cycle, the apparatus may be automatically returned to one or more selected positions corresponding to those orientations of the apparatus which produced the largest amplitude carrier component in the cell's output signal. Such positions correspond to those orientations at which target energy has likely been detected. After redirection of the apparatus so that its field of view embraces that general volume in space in which target energy has been detected, the second or "track" step of the position determining process is initiated, namely, that of determining the position of the target with respect to the optical axis of the energy collection apparatus and causing the field of view to follow any target motion. This tracking action has in most instances been carried out by causing the optical axis of the collection apparatus to cyclically move or "nutate" around a circular path with respect to the volume of space which embraces the target.

More specifically, in one form of tracking system, during nutation, the optical axis of the energy collection system, as projected into space, is moved or "nutated" around a closed loop or path defined on a spherical surface in space. This path is so positioned and restricted in size as to afford pick-up of energy from the target during nutation of the instantaneous field of view. As a result, a frequency modulation will be imposed on the carrier component of the cell's output signal. By comparing the phase of the frequency modulation with a reference signal having an instantaneous phase depicting the instantaneous position of the optical axis as it is nutated, the polar angular coordinate of the target, in a set of reference polar coordinates, may be ascertained. Similarly, the magnitude of the frequency modulation imposed on this carrier component will be a measure of the polar radius coordinate in this same set of coordinates. From this information, a servo control system may be brought into action to track or follow any target motion.

However, in the daytime, there appears along with the radiant energy collected from an object or target in space a substantial amount of ambient background radiation emitted by natural geographical formations, clouds and man-made structures, such as buildings. During daylight hours especially, the amount of reflected solar radiation from background objects is sometimes much greater than the radaition from the object or target to be sensed, so that the effective range and sensitivity of the detection system may be seriously limited. It is to this problem that the present invention is directed.

However, in one known optical detection system of the above-described type, the aforesaid effects of ambient background radiation are suppressed by spectral or color filtering techniques. In such a system of "background suppression," advantage is taken of the fact that the spectral distribution of the radiant energy emitted from most man-made objects or targets (such as jet aircraft, missiles, rockets, etc.), markedly differs from the spectral distribution of radiant energy either emitted or reflected from background objects. Thus, a special form of episcotister or chopping reticle is employed to modulate or chop the energy appearing at the imaged field of view and reaching the energy-sensitive cell. Similar to the above-described chopping reticle, this special reticle generally takes the form of a flat circular disc adapted to be spun or rotated about a central axis perpendicular to the faces of the disc. As before, the reticle is positioned at a focal plane of the associated collection apparatus. In contrast, however, to the previously described chopping reticle, which bears only a pattern defined by areas of relative opacity and transmissivity to all collected energy, this "spectral or color-filtering" reticle is made up of an even-numbered plurality of thin sector-like or pie-shaped spectral filters mounted adjacent to one another about the rotational axis of the reticle. These spectral filters are provided in two equal numbered sets or types. The first set or type comprises filters all having a first given spectral transmission characteristic, while the second set comprises filters having a second given spectral transmission characteristic, the second characteristic being different from the first characteristic. The filters are arranged in alternation around the disc so that any two adjacent filters have different transmission characteristics, each corresponding to one or the other of the above first and second transmission characteristics.

The first and second given transmission characteristics assigned to these sets of filters are selected in terms of the spectral response characteristics of the energy sensitive cell taken in combination with the expected distribution of received target and background energies. Specifically, the filter transmission characteristics are made such that the magnitude of output signal developed by the cell is the same for either filter characteristic in response to typical background energy in the absence of target energy. However, in response to expected target energy, the output signal from the cell is different in magnitude for each type filter sector.

It can thus be seen that for a background having a specific spectral energy distribution corresponding to that for which the two filter transmission characteristics have been "designed," rotation of the reticle will produce virtually no change in the cell output signal. However, a substantial alternating output signal will be developed by the cell in response to targets emanating energy, the spectral energy distribution of which is different from the "design" background spectral distribution. Thus, this special "spectral or color-filtering" reticle will, in effect, chop target energy but will not chop background energy. The effects of background energies in target or object detection can, therefore, be seen to be suppressed by such spectral or color-filtering techniques.

Such a background suppression system has been found to be quite satisfactory under conditions where the spectral aspects of background conditions complement the design characteristics of the "color-filtering" reticle. As a practical matter, however, such special background conditions will not always be encountered. As the field of view of the energy collection apparatus is caused to search or track targets, a continuously changing spectral distribution of background energies can be expected. The random nature of this background change, of course, acts to reduce the overall effectiveness of the above-described spectral or color filtering background suppression system.

In the radiation detection system of the aforesaid co-pending application, electrical signals are generated in separate signal channels, each representing radiant energy received within a separate spectral band. Background signal suppression is achieved through the equalization of the background signal components appearing in each signal channel with the equalized signals then being subtractively combined to cancel the background signal components, leaving substantially only target energy signals. Where target energy appears in only one of the signal channels, little or no cancellation of the target energy signal occurs. However, where target signal energy appears in both of the signal channels, the background suppression process produces a cancellation of a certain amount of the target energy signals as well, since only the difference signal is provided as an output signal.

Furthermore, in the radiant energy detection system of the co-pending application, even under the most favorable conditions where target energy falls in only one spectral band, the magnitude of target signal developed is limited to the sensitivity of but one energy sensitive cell. As will be seen, through the application of the principles of the present invention, a substantial increase in the amount of target energy may be secured by permitting both cells to, at all times, constructively contribute to the generation of target indicating signals with a consequent increase in the efficiency and reliability of the system.

Accordingly, it is an object of the present invention to provide a radiant energy detection system for automatically suppressing the effects of background radiation, while at the same time providing an enhanced target signal.

It is an other object of the present invention to provide a new and improved radiant energy detection system in which target signal components are separated from ambient background radiation with an output signal being provided representing a significantly improved portion of all of the target signal components.

It is yet another object of the present invention to provide a new and improved electro-optical radiant energy detection system in which overlapping spectral bands are employed for the purpose of suppressing the effects of ambient background radiation to provide an output signal representing received radiant energy from a selected source.

It is a still further object of the present invention to provide a new and improved radiation detection system having an increased range and efficiency of operation.

Yet another object of the present invention is to provide a new and improved radiant energy detection system which is capable of precisely locating and tracking radiant energy emissive targets which appear in a field of view against a relatively high level of ambient background radiation.

In accordance with one aspect of the invention, a radiant energy detection system is provided in which radiant energy is collected by an optical system and two separate electrical signals are generated representing received radiant energy falling within two different spectral bands. The two spectral bands are selected so that one of the spectral bands encompasses the other of the spectral bands with the common portion of the spectral bands encompassing wavelengths of radiant energy corresponding to those emanated from a selected source such as a target. Accordingly, each of the generated electrical signals includes components representing both ambient background radiation and components representing radiation from a source such as a target. The electrical signals are then combined to develop a difference signal representing a portion of one of the spectral bands falling outside of the other of the spectral bands, which portions represents substantially only ambient background radiation. The difference signal is combined with each of the two electrical signals in such a way as to produce a signal in each of two separate channels representing substantially only target radiation free of the effects of ambient background radiation.

In a preferred arrangement of the invention, separate target signals are combined to produce an output signal representing target energy passing through each of the two separate channels, thereby enhancing the effectiveness of the system as a whole since substantially no target energy components are cancelled or suppressed in the operation of the background suppression arrangement of the invention and target energy is derived from two separate signal channels in each of which a target energy signal may be produced which is alone equal to the value of a target signal provided by previously known systems.

In one particular embodiment of the invention, separately generated electrical signals, as described above, are subtractively combined to produce a background representative signal which is applied to at least one variable gain amplifier, with the output of the amplifier being applied to a signal combining arrangement within which the background representing signal functions to cancel signal components from the generated electrical signals attributable to background radiation. A control signal may be derived from the output of the signal combining arrangement to adjust the amplitude of the variable gain amplifier in order to effect substantially complete cancellation of background signal components.

In a preferred embodiment in accordance with the invention, a radiation detection system is provided in which two separate electrical signals are generated representing received radiation falling within two overlapping spectral bands, the electrical signals being combined to generate an automatic gain control signal which is applied to a pair of variable gain amplifiers for the purpose of maintaining the peak amplitudes of both the electrical signals within a predetermined range. The signals passed by the automatic gain control amplifiers are then subtractively combined to generate a difference signal representing substantially only background signal components. A pair of variable gain amplifiers are each connected to pass the background representing signals to separate signal combining arrangements within which the signal representing the background and each of the two separate electrical signals are combined. A control signal is derived from at least one of the signal combining means to vary the gains of the variable gain amplifiers to effect a substantially complete cancellation of background signal components at the outputs of the signal combining means. An output circuit is arranged to receive target energy signals appearing at the outputs of both of the signal combining means which in a searching mode of operation represents the presence of an object emitting radiation falling within the field of view of the detection system.

In a tracking mode of operation in which radiant energy from a selected object is received and alternating current signals are generated representing radiation falling within two overlapping spectral bands, the alternating current signals may be subtractively combined to produce a background representing signal which may be employed for the purpose of suppressing background signal components on an alternating current basis whereby an alternating current output signal may be derived for tracking purposes which is substantially free of the effects of background radiation.

A better understanding of the invention may be had from a reading of the following detailed description and an inspection of the drawings, in which.

Figures 1, 2:
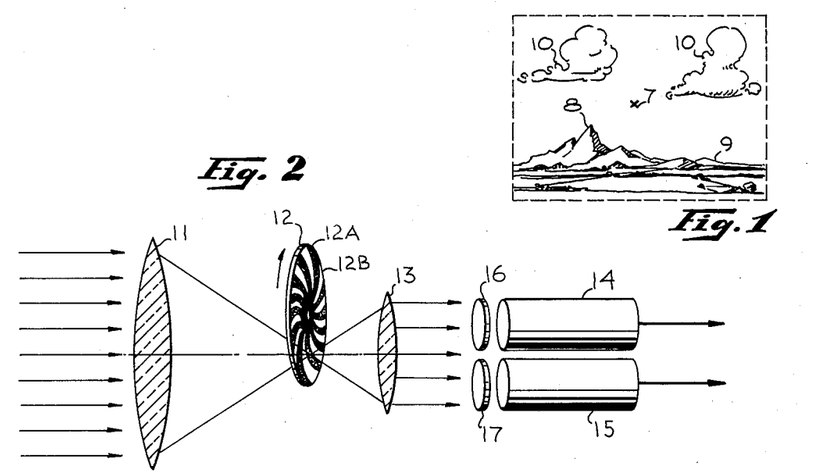
FIG. 1 is a simplified drawing of a scene from which may be received radiant energy emitted by a selected source along with ambient background radiation.
FIG. 2 is a diagrammatic illustration of a portion of a radiant energy system in accordance with the invention which is capable of producing two separate electrical signals corresponding to received radiant energy falling within two overlapping spectral bands.

In FIG. 1, there is illustrated a typical scene within which radiant energy in the infrared spectrum may be emitted by a selected source in the form of a target 7. Along with the radiation from the target 7 in the typical scene of FIG. 1, there may be emitted ambient background radiation from geographic formations in the shape of a mountain 8 and a land mass 9 as well as from the clouds 10. In conventional radiation detection systems in which it is desired to ascertain the presence and position of an object such as the target 7, the problem of discriminating between the radiation received from the target and the ambient background radiation produced by other objects within the field of view is difficult. Particularly during the daytime hours, the reflected solar radiation from the background objects may approach the intensity of the radiation from the target 7 with the result that the presence of the target may go undetected. Accordingly, the distance at which the presence of the target 7 may be ascertained by known types of radiation detection systems is severely limited by the effects of ambient background radiation.

In practice, a scene such as that illustrated in FIG. 1 is scanned by an optical system having an instantaneous field of view which encompasses only an elemental part of the scene at any given time. Any suitable scanning pattern may be employed through a movement back and forth and up and down of the optical system as a whole so that upon the completion of an entire scanning pattern, radiation being emitted from any object within the scene is received.

In FIG. 2, there is illustrated diagrammatically one suitable system by means of which electrical signals may be generated representing the radiation received from a scene such as that of FIG. 1. In the arrangement of FIG. 2, the optical system for collecting and focusing radiant energy received is illustrated diagrammatically by a lens 11. However, it will be appreciated that the lens 11 may comprise either a number of separate lens elements or, in the alternative, one or more mirrors having a configuration which achieves the desired collection and focusing of the radiant energy. Radiant energy from the optical system represented by the lens 11 is brought into focus at a focal plane in which is located a rotating chopping reticle 12, sometimes referred to as an episcotister, which has alternate sectors 12A and 12B which are opaque and transparent, respectively, to the received radiant energy. Thus, as the reticle 12 rotates, the opaque sectors 12A are swept across the field of view, thereby modulating the received radiant energy.

A secondary optical system represented diagrammatically by a lens 13 is placed behind the reticle 12 and serves to direct the modulated radiant energy passed by the reticle 12 toward a first radiation sensitive cell 14 and a second radiation sensitive cell 15.

The separation of the received radiant energy passed by the secondary optical system 13 into two overlapping spectral bands may be accomplished by means of the optical filters 16 and 17 placed in front of each of the cells 14 and 15. By adapting the characteristics of the optical filters 16 and 17 to work in conjunction with the individual characteristics of the radiation sensitive cells 14 and 15, electrical signals may be generated corresponding to received radiant energy falling within each of the spectral bands.

Figure 3:
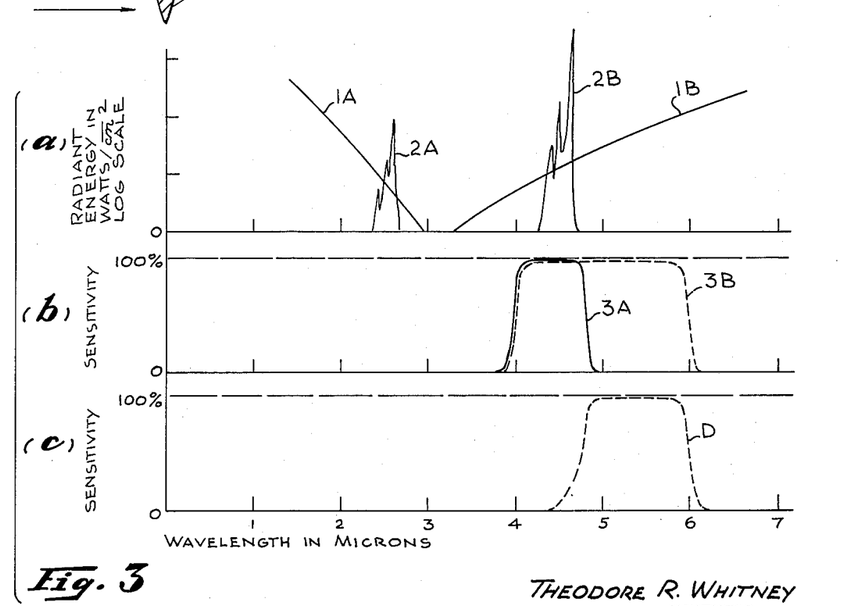
FIG. 3 is a set of graphical illustrations of the spectral distributions of radiant energy attributable to radiation from a selected source as well as from ambient background radiation along with the response characteristics of separate channels in a system in accordance with the invention.

In the graphical illustration of FIG. 3(*a*), there has been shown the spectral distribution of radiant energy received from a representative field of view in which there is present radiant energy attributable to a target and radiant energy attributable to background objects. Thus, over a first part of the spectral band, the ambient background radiation curve 1A slopes downwardly with increasing wave lengths and over a second part of the spectral band 1B the curve 1B rises with increasing wave lengths.

Although energy received from a target will be superimposed upon the background radiation represented by the curves 1A and 1B, for convenience, the target radiation from a typical target has been separately represented by curves 2A and 2B in FIG. 3(*a*).

Accordingly, at about 2.7 microns wave length, the curve 2A indicates that radiation in substantial quantity is received attributable to a portion of the waste products emitted by a missile or the like. In a similar fashion, at about 4.5 microns there appears a substantial amount of radiation represented by the curve 2B which is attributable to fundamental radiation from hot exhaust gases emitted by a missile or the like.

In accordance with the present invention, the optical filters taken together with the characteristics of the radiation sensitive cells 14 and 15 of FIG. 2 are responsive to radiant energy falling within two overlapping spectral bands. A first electrical signal corresponding to the narrower of the two spectral bands may be generated by the radiation sensitive cell 14 as illustrated by curve 3A of FIG. 3(*b*). A second electrical signal corresponding to a spectral band illustrated by curve 3B may be generated by the radiation sensitive cell 15. From an inspection of FIG. 3(*b*) it is apparent that the curves 3A and 3B encompass a common range of wave lengths of spectral energy. However, one of the spectral bands represented by curve 3B not only encompasses the spectral band falling within curve 3A but an additional range of wave lengths of spectral energy as well. Thus, there may be generated by the radiation sensitive cell 14, in a first channel, an electrical signal corresponding to received radiation encompassed by the curve 3A between 4.0 and 4.8 microns and there may be generated in a second signal channel by the cell 15 an electrical signal corresponding to received radiant energy falling within the spectral band encompassed by the curve 3B between 4.0 and 6.0 microns. Accordingly, there appears, in each of the two channels, signals attributable to both ambient background radiation and target radiation.

Figures 4, 5:
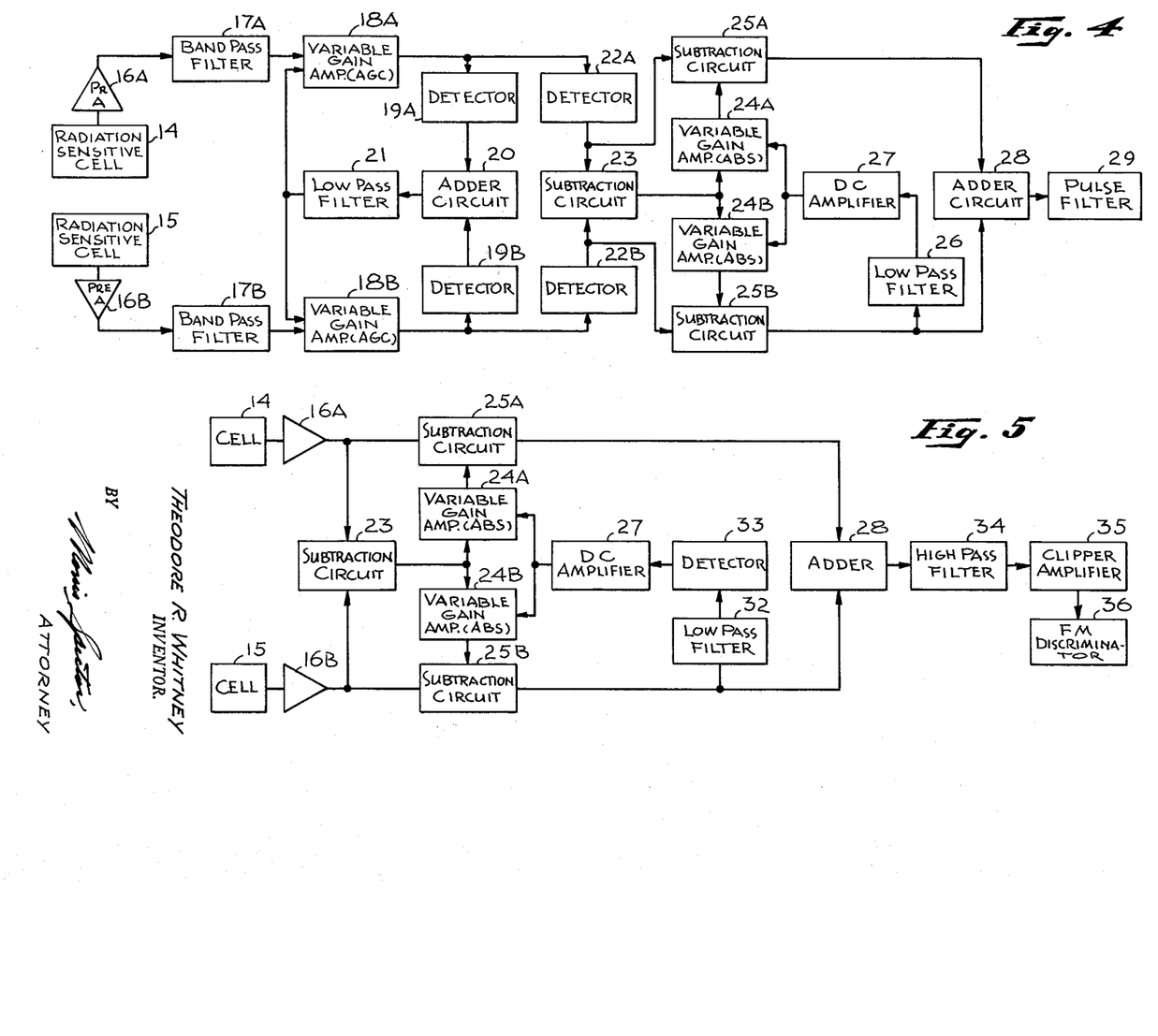
FIG. 4 is a block diagram of a portion of a radiant energy detection system in accordance with the invention in which the effects of ambient background radiation are substantially suppressed and an output signal is derived representing target energy passing through separate channels.
FIG. 5 is a block diagram of a portion of a radiant energy detection system in accordance with the invention which is adapted to suppress the effects of background radiation on an alternating current basis to provide an output signal representing target energy passing through separate channels.

In accordance with the present invention, the signals appearing in each of the signal channels are employed to achieve an automatic suppression of the effects of ambient background radiation while at the same time effecting a maximum utilization of the electrical signal components representing target radiation. A system in accordance with the invention for achieving automatic background suppression utilizing overlapping spectral bands within each of which target radiation appears is illustrated in FIG. 4 in which the electrical signals generated by the cells 14 and 15 (the same reference characters being employed as in FIG. 2) are passed through separate channels in each of which there may be included a preamplifier 16A, 16B. The amplified signals from the preamplifiers 16A and 16B are supplied to the band pass filters 17A and 17B, respectively, which function to pass the alternating current signals and side bands produced by the modulation of the radiation through the rotation of the reticle 12 of FIG. 2.

The band pass filters 17A and 17B should be designed to have a center frequency substantially corresponding to the frequency of the generated alternating current signals and a band width encompassing the side bands surounding the center frequency. For example, where the speed of rotation of the reticle 12 (FIG. 2) and the number of opaque sections, 12A, produce amplitude modulated signals at the output of the cells 14 and 15 having a frequency of 5,000 cycles per second, the band pass filters 17A and 17B (FIG. 4) should be designed to have a center frequency of substantially 5,000 cycles per second. The band width of each of the band pass filters 17A and 17B is determined by the dwell time during which energy from a target is passed by one of the transparent sectors of the reticle 12 of FIG. 2. With a 5,000 cycles per second alternating current signal being generated, the dwell time equals 40 milliseconds and the band width of each of the band pass filters 17A and 17B may be 500 cycles per second. In operation, the band pass filters 17A and 17B function to block the passage of noise which may be generated by the cells 14 and 15 outside of the pass band of the band pass filters.

In the operation of radiation detection systems, it has been found that the amplitude of the received signals varies over extremely wide ranges. For example, it is not unusual to find amplitude ranges of 10,000:1 in a radiation detection system of the type to which the present invention relates.

In order to compress the amplitude ranges of the signals so as to insure a proper operation of the automatic background suppression components, signals from the upper channel band pass filter 17A are applied to a variable gain amplifier (AGC) 18A and similarly, the signals from the band pass filter 17B in the lower channel are applied to a variable gain amplifier (AGC) 18B.

Output signals from the AGC variable gain amplifiers 18A and 18B are each applied to the detectors 19A and 19B, respectively, which function to demodulate the alternating current signals so that each of the detectors 19A and 19B functions to generate an output signal representing the amplitude of the alternating current signals in the separate channels. The output signals from detectors 19A and 19B are then applied to an adder 20 which combines the signals to produce a composite output signal representing the total of the amplitudes of the signals in each of the separate channels.

The composite signal from the adder 20 is applied to a low pass filter 21 which functions to block the passage of any unwanted alternating current signals which may appear at the outputs of the detectors 19A and 19B. For example, with alternating current signals of 5,000 cycles per second as set forth above, the low pass filter 21 may have a pass band from zero to 1,000 cycles per second. The output signal from the low pass filter 21 represents the total of the amplitudes of the alternating current signals in each of the channels and is applied to the variable gain amplifiers 18A and 18B which function in a conventional fashion to limit the amplitude range of the signals passed thereby. Since biasing arrangements for variable gain amplifiers which function to lower the gain in accordance with increases in control voltage and raise the gain in accordance with decreases in control voltage are well known, it is apparent that there may be achieved at the output of the variable gain amplifiers 18A and 18B alternating current signals having amplitude ranges which are limited within a dynamic range of 10:1.

Amplitude limited signals from the variable gain amplifiers 18A and 18B are applied to a second set of detectors 22A and 22B which function to demodulate the alternating current signals passed by the amplifiers 18A and 18B so as to generate respective output signals representing the amplitude of the alternating current signals. The outputs from the detectors 22A and 22B comprise essentially D.C. and low frequency components which are applied to a subtraction circuit 23 which subtractively combines the output signals from the detectors 22A and 22B so as to generate a signal representing the difference in amplitude of the signals applied thereto. For example, the subtraction circuit 23 may comprise a conventional resistor network for combining electrical signals, or in the alternative may comprise a conventional differential amplifier arranged to provide an output signal representing the difference in amplitude between the signals applied thereto.

The difference signal supplied by the subtraction circuit 23 comprises signal components representing received radiant energy falling within the relatively wide spectral band not encompassed by the relatively narrow spectral band. Since the electrical signal in one signal channel contains signal components not found in the signal in the other signal channel, the result is that the subtraction circuit 23 effects a cancellation of the common signal components found in both signal channels with a resultant difference signal being provided representing only those signal components which are not common to both channels.

Referring again to FIG. 3 and specifically FIGS. 3(b) and 3(c), it may be seen that the signal components represented by the difference signal from the subtraction circuit 23 correspond only to received energy in the form of ambient background radiation falling in the range D of FIG. 3(c)—that is, the difference between signals respectively representing energy in bands 3B and 3A of FIG. 3(b). Therefore, the signal from the subtraction circuit 23 may be referred to as a background representing signal which may be employed in accordance with the invention to effect a cancellation of background signal components appearing in each of the two signal channels. Since the background energy appearing in the range D of FIG. 3(c) is proportional to the background energy in both the spectral bands 3A and 3B, the corresponding background representing signal from the subtraction circuit 23 may be used to suppress background signal components in both electrical signal channels as described below.

The background representing signal from the subtraction circuit 23 is applied to a first variable gain amplifier 24A associated with the upper signal channel and a second variable gain amplifier 24B associated with the lower signal channel. Each of the variable gain amplifiers 24A and 24B is designated (ABS) to indicate its function in the automatic background suppression arrangement. Signals appearing at the output of the first variable gain amplifier 24A are applied to a subtraction circuit 25A in the upper signal channel which also receives signals appearing at the output of the detector 22A. In a similar fashion, signals appearing at the output of the second variable gain amplifier 24B are applied to a subtraction circuit 25B in the lower signal channel which also receives signals from the detector 22B. Each of the subtraction circuits 25A and 25B functions to subtractively combine signals passed by the variable gain amplifier associated therewith and the signal components appearing at the output of the detectors 22A and 22B respectively. The subtraction circuits 25A and 25B may comprise, for example, conventional resistor networks or differential amplifiers as noted above with reference to the subtraction circuit 23.

By controlling the gain of the variable gain amplifiers 24A and 24B the background representative signal from the subtraction circuit 23 may be applied to the subtraction circuits 25A and 25B in such a way as to effect a cancellation of the background signal components appearing in each signal channel. For this purpose, a signal appearing at the output of the subtraction circuit 25B may be applied to a low pass filter 26 which has a cutoff frequency capable of separating background signal components from target signal components. With a 5,000 cycle per second alternating current signal being generated as set forth above, the low pass filter may have a pass band from zero to a cutoff frequency appreciably lower than the target frequency spectrum cutoff. Accordingly, there is applied to a D.C. amplifier 27 a signal passed by the low pass filter 26 representing substantially only the background signal components which may appear at the output of the subtraction circuit 25B.

The D.C. amplifier 27 functions to apply a control voltage to each of the variable gain amplifiers 24A and 24B which alters the degree of amplification of the amplifiers in order that a signal may be applied to the subtraction circuits 25A and 25B which is substantially equal and opposite to the background signal components appearing in the output signal from the detectors 22A and 22B. Thus, the automatic background system in the lower signal channel functions as a closed loop servo system in which the presence of any substantial amount of background signal components at the output of the subtraction circuit 25B effects an increase in gain of the variable gain amplifier 24B so as to increase the background representing signal applied to the subtraction circuit 25B and to reduce the background signal components appearing at the output of the subtraction circuit 25B to a minimum.

With respect to the upper signal channel, it has been found that a cancellation of background components may be effected where the background representative signal from the subtraction circuit 23 is applied to the subtraction circuit 25B in a magnitude which is closely related to the magnitude of the signal applied to the subtraction circuit 25B of the lower signal channel. Accordingly, a single D.C. amplifier 27 may be employed to control both of the variable gain amplifiers 24A and 24B to effect a signal cancellation in each of the signal channels. However, the actual amplitude of the signals applied to the subtraction circuits 25A and 25B may differ in view of the difference in bandwidth of the spectral bands to which each of the separate signal channels is responsive. So long as the relative amounts of background radiation appearing in each of the signal channels remains substantially constant, the amplitude of the signals applied to the subtraction circuits may be preset by any simple means such as a potentiometer to effect a proper operation of the system in suppressing background single components in both of the channels. Accordingly, a relatively smaller signal from the output of the variable gain amplifier 24A may be applied to the subtraction circuit 25A as compared with the signal which is applied by the variable gain amplifier 24B to the subtraction circuit 25B, as required.

Provision for the differing amplitudes of the signals may be readily made by an adjustment of the overall gain of each of the variable gain amplifiers 24A and 24B through a suitable selection of components or by the use of a variable signal attenuator. In a practical embodiment, each of the variable gain amplifiers 24A and 24B may include a variable signal attenuator which is adjusted under normal conditions of operation to effect a substantial cancellation of background signal components from the outputs of the subtraction circuits 25A and 25B so that signals from the outputs of each of the subtraction circuits 25A and 25B contain target signal components substantially free of the effects of ambient background radiation.

By means of an adder circuit 28, the target signals may be combined so as to provide a composite output signal having target signal components derived from both the upper and lower signal channels substantially free of background signal components. Thus, through the use of overlapping spectral bands for the separate signal channels along with the automatic background suppression system of the present invention, a substantially increased amplitude of target signals may be provided at the output of the system. Where the radiation sensitive cells 14 and 15 share a common aperture in a radiation detection system in accordance with the invention, an improvement in the overall operation of the system is obtained which enables the system to detect target energy emanating from a volume of space where the source of the target energy is relatively distant and appears along with a relatively high value of ambient background radiation.

In an arrangement in which the optical system associated with the radiation detection system is positioned in a scanning pattern with respect to a volume of space, signal components which are attributable to target information are substantially in pulse form where the target is a point source across which the optical system passes. Accordingly, a corresponding electrical signal in pulse form appears at the output of the adder 28 which may be separated from any undesirable signal components present by means of a pulse filter 29. The filter 29 may, for example, comprise a low pass filter having a pass band from zero to an upper frequency limit determined by the duration of a typical pulse attributable to target radiation.

In the description of the operation of the above-described system, it has been assumed that the optical system is scanned across a field of view searching for the existence of radiant energy emissive targets. The result is that radiant energy emitted by a target is within the field of view of the system only momentarily so that the target radiation produces a pulse at the output of the pulse filter 29 while the suppressed ambient background radiation does not.

In a different mode of operation, the invention may be employed in a system for tracking a selected target from which radiant energy is received continuously. For this purpose, there may be connected to the output of the pulse filter 29 various threshold, correlation and decision circuitry (not shown) which functions to identify a particular target for tracking. By energizing a switching arrangement such as a relay whenever a selected target is identified, the optical system may be switched to a tracking mode in which radiant energy from the target is received substantially continuously. In one type of tracking system, a special movement of the reticle known as nutation is performed in which the axis of rotation of the reticle revolves about the image in the focal plane. The result is that the speed of the spokes passing through the focal plane varies as the axis of the reticle revolves to impart a frequency modulation to the electrical signal produced by the radiation sensitive cells in response to the target.

Since the low pass filter 26 responds to substantially continuous signals, there appears at the output of the filter a signal corresponding to the difference between target components as well as background components appearing in the separate channels. Therefore, the output of the filter 26 no longer distinguishes between background components and target signal components and is unsuitable for use in adjusting the background signal components to achieve cancellation.

An alternative arrangement is shown in FIG. 5 for use in a tracking mode of operation which effects an automatic background suppression where target energy is received substantially continuously. In FIG. 5, the same reference characters have been employed as in FIG. 4 to designate similar parts. Thus, signals derived from two separate radiant energy sensitive cells 14 and 15 are amplified in separate channels by means of the preamplifiers 16A and 16B. However, in the arrangement of FIG. 5 low frequency signals which are blocked in the arrangement of FIG. 4 by band pass filters 17A and 17B are applied directly without detection to the subtraction circuit 23. Between the preamplifiers 16A and 16B and the subtraction circuit 23, there may be connected, if desired, a pair of automatic gain control variable gain amplifiers as shown in FIG. 4.

In FIG. 5, the subtraction circuit 23 functions to generate a difference signal containing alternating current components representing background radiation only. As before, the signals appearing in each of the separate signal channels correspond to two overlapping spectral bands so that the subtraction circuit 23 functions to provide an output signal representing only those components which are not common to both channels. Where the spectral bands are selected in accordance with FIG. 3(b) the subtraction circuit 23 provides a background representing signal corresponding to signal components falling within the broader of these spectral bands but outside of the narrower of the spectral bands. The alternating current background representing signal components from the subtraction circuit 23 are applied to the variable gain amplifiers 24A and 24B which function to apply a variable amplitude alternating current signal representing the background signal components to the subtraction circuits 25A and 25B within which there is effected a cancellation of background signal components in each of the signal channels on an alternating current basis.

In each signal channel of FIG. 5, there appears a low frequency unmodulated signal component, corresponding to variations in radiation received from background objects along with the alternating current wave produced by the action of the rotating reticle upon the radiation received from background objects, and a frequency modulated alternating current signal where a revolving reticle is employed following a nutational pattern as described previously. A low pass filter 32 functions to pass the low frequency component of the signal appearing in the lower channel while blocking the passage of the alternating current signal component so that there appears at the output of the detector 33 a signal corresponding to the received ambient background radiation as presented by the low frequency component.

In practice, it has been found that the low frequency component corresponds closely to the alternating current components attributable to the modulation of the received background radiation. Accordingly, by means of a D.C. amplifier 27, there may be derived a control signal for application to the variable gain amplifiers 24A and 24B which alters the gains of the variable gain amplifiers in a direction which tends to effect a cancellation of the components attributable to background radiation in each of the separate channels. As before, both of the variable gain amplifiers 24A and 24B may be operated under the control of the signal from the D.C. amplifier 27 although it will generally be desirable to employ signal attenuators or other devices to produce an amplification factor in the variable gain amplifier 24A which differs from that of the variable gain amplifier 24B.

Although the arrangement of FIG. 5 proceeds upon the assumption that a good correlation occurs between the low frequency signals corresponding to ambient background radiation and the alternating current components produced by the action of the reticle in modulating the ambient background radiation, in practice the relationship between the two has been found to be quite good so that by means of the arrangement of FIG. 5 the continuous suppression of ambient background signals may be provided in a radiation detection system during a tracking mode of operation.

As before, the signals passed by the subtraction circuits 25A and 25B may be applied to an adder 28 which functions to provide a composite output signal representing target energy appearing in each of the separate channels substantially free of the effects of background radiation. Accordingly, any frequency modulated waves produced by the continuous tracking of a target appears at the output of the adder 28. A high pass filter 34 functions to separate the frequency modulated wave from other signal components for application to a conventional clipper amplifier 35 which functions as an amplitude limiter. The amplitude limited signal from the clipper amplifier 35 may be applied to an FM discriminator 36 which functions to demodulate the frequency modulated target signal components and the demodulated signal may then be applied to suitable servo systems (not shown) for positioning the optical system to effect a tracking operation as well as to control the guidance of interceptor missiles for a vehicle carrying the detection system itself if desired.

Although there has been described above a radiation detection system in accordance with the invention which may be employed for the automatic suppression of the effects of ambient background radiation, it is intended that the specific systems shown in FIGS. 2, 4 and 5 and described in detail above be exemplary only of the manner in which the principles of the present invention may be used to advantage. Accordingly, any and all variations, modifications, or equivalent arrangements falling within the scope of the annexed claims should be considered to be a part of the present invention.

I claim:

1. In a radiation detection system in which radiant energy is received from a selected source having a given spectral distribution along with ambient background radiation having a spectral distribution which differs substantially from the spectral distribution of radiant energy received from said selected source, the combination of means generating a first electrical signal representing received radiation falling within a first spectral band, means for generating a second electrical signal representing received radiation falling within a second spectral band encompassing the first spectral band, means for combining said first and second electrical signals to produce a third signal representing radiation falling within said second spectral band substantially outside of said first spectral band, and means combining said first, second and third electrical signals to provide an output signal representing radiation from said selected source substantially free of the effects of ambient background radiation.

2. In a radiation detection system the combination of an optical system for receiving radiant energy from a selected source having a given spectral distribution along with ambient background radiation having a spectral distribution which differs substantially from the spectral distribution of radiant energy received from said selected source, a first radiation sensitive cell for generating a first electrical signal representing received radiation falling within a first spectral band, a second radiation sensitive cell for generating a second electrical signal representing received radiation falling within a second spectral band encompassing the first spectral band, means for combining said first and second electrical signals to produce a third signal representing radiation falling within said second spectral band outside of said first spectral band, and means combining said first, second and third electrical signals to provide an output signal representing radiation from said selected source substantially free from the effects of ambient background radiation.

3. In a radiation detection system in which radiant energy is received from a target having a given spectral distribution along with ambient background radiation having a spectral distribution which differs substantially from the spectral distribution of radiant energy received from said target, the combination of an optical system for collecting radiant energy emanating from a volume of space encompassed by a predetermined conditionally movable field of view, a first radiation sensitive cell responsive to radiation collected by said optical system within a first spectral band, a second radiation sensitive cell responsive to radiation collected by said optical system within a second spectral band encompassing the first spectral band, subtraction means coupled to said first and second radiation sensitive cells for developing an output signal representing a portion of said second spectral band falling outside of said first spectral band, background suppression means coupled to said subtraction means and said first and second radiation sensitive cells, variable control means coupled to said background suppression means for enabling the background suppression means to suppress the effects of background radiation in accordance with the received background radiation falling within the portion of the second spectral band outside of the first spectral band and an output circuit coupled to said suppression means for passing an output signal representing radiation from said target substantially free of the effects of background radiation.

4. In a radiation detection system in which radiant energy is received from a target having a given spectral distribution along with ambient background radiation having a spectral distribution which differs substantially from the spectral distribution of radiant energy received from said target, the combination of an optical system for collecting radiant energy emanating from a volume of space encompassed by a predetermined field of view, a first radiation sensitive cell responsive to radiation collected by said optical system within a first spectral band, a second radiation sensitive cell responsive to radiation collected by said optical system in a second spectral band encompassing the first spectral band, subtraction means coupled to said first and second radiation sensitive cells for developing a signal representing radiation included in said second spectral band falling outside of said first spectral band only, and means for suppressing background signal components coupled to at least one of said radiation sensitive cells in accordance with the signal provided by said subtraction means.

5. In a radiation detection system in which radiant energy is received from a target having a given spectral distribution along with ambient background radiation having a spectral distribution which differs substantially from the spectral distribution of radiant energy received from said target, the combination of an optical system for collecting radiant energy emanating from a volume of space encompassed by a predetermined field of view, a first radiation sensitive cell, a first optical filtering means for passing radiation collected by said optical system to said first cell within a first spectral band, a second radiation sensitive cell, a second optical filtering means for passing radiation collected by said optical system to said second cell within a second spectral band encompassing the first spectral band, subtraction means coupled to said first and second radiation sensitive cells for developing a signal representing radiation included in said second spectral band falling outside of said first spectral band only, and means for suppressing the effects of background from the signal provided by at least one of said radiation sensitive cells in accordance with the signal provided by said subtraction means.

6. An electro-optical radiation detection system in which radiant energy is received from a target having a given spectral distribution along with ambient background radiation having a spectral distribution which differs substantially from the spectral distribution of the radiant energy received from the target, the combination of an optical system for collecting radiant energy emanating from a volume of space falling within a field of view, a first signal channel including a radiation sensitive cell arranged to receive radiant energy collected by said optical system falling within a first spectral band, a second signal channel including a radiation sensitive cell arranged to receive energy collected by the optical system falling within a second spectral band encompassing the first spectral band, subtraction means coupled to said first and second signal channels for developing a background representing signal corresponding to radiant energy falling within said second spectral band outside of said first spectral band, background suppression means responsive to said signal from said subtraction means for effecting a suppression of signal components in each of said channels corresponding to background radiation and target indicating means coupled to said first and second signal channels for generating an output signal corresponding to target energy substantially free from the effects of background radiation.

7. An electro-optical radiation detection system in which radiant energy is received from a target having a given spectral distribution along with ambient background radiation having a spectral distribtuion which differs substantially from the spectral distribution of the radiant energy received from the target, the combination of an optical system for collecting radiant energy emanating from a volume of space falling within a field of view, a first signal channel including a radiation sensitive cell arranged to receive radiant energy collected by said optical system falling within a first spectral band, a second signal channel including a radiation sensitive cell arranged to receive energy collected by the optical system falling within a second spectral band encompassing the first spectral band, means responsive to the electrical signals in each of said first and second signal channels for developing a background representing signal corresponding to radiation falling within said second spectral band and outside of said first spectral band, and background suppression means responsive to said control signal and coupled to at least one of said signal channels for effecting a cancellation of signal components attributable to background radiation.

8. In an electro-optical radiation detection system in which received radiant energy comprises energy emanating from a target along with ambient background radiation, the combination of an optical system for collecting radiant energy falling within a field of view, means for separating the energy collected by the optical system into differing spectral bands one of which encompasses the other of the spectral bands, a first radiation sensitive cell arranged to receive energy within a first one of said spectral bands, a second radiation sensitive cell arranged to receive energy within a second one of said spectral bands, subtraction means coupled to said first and second radiation sensitive cells for developing a background representing signal, at least one variable gain amplifier coupled to said subtraction means, signal combining means coupled to at least one of said radiation sensitive cells and said variable gain amplifier, means coupled between said signal combining means and said variable gain amplifier for controlling the amplification of said variable gain amplifier to produce an output signal from said signal combining means representing target radiation substantially free of the effects of ambient background radiation.

9. In a radiant energy detection system for receiving radiant energy from a selected source along with ambient background radiation where the spectral distribution of the radiation from said selected source differs markedly from the spectral distribution of said ambient background radiation, including the combination of means generating an alternating current signal representing received radiant energy falling within a first spectral band, means generating a second alternating current signal representing received radiant energy falling within a second spectral band encompassing the first spectral band, signal subtraction means coupled to said first and second alternating current signal generating means for providing a signal representative of ambient background radiation falling within said second spectral band outside of said first spectral band, first signal combining means coupled to said first alternating current signal generating means, second signal combining means coupled to said second alternating current generating means, and at least one variable gain amplifier coupled between said signal subtraction means and said signal combining means, background suppression control circuit connected between at least one of said signal combining means and said variable gain amplifier for effecting a cancellation of signal components attributable to ambient background radiation, and signal combining means coupled to said first and second signal combining means for providing an output signal representing radiation from said selected source substantially free of ambient background radiation.

10. In a radiation detection system for receiving target radiation and ambient background radiation where the target radiation has a spectral distribution differing markedly from the spectral distribution of the ambient background radiation, the combination of a first signal channel adapted to pass electrical signals representing target radiation and ambient background radiation falling within a relatively narrow spectral band, a second signal channel adapted to pass electrical signals representing target radiation and background radiation falling within a relatively wide spectral band encompassing the narrow spectral band, signal subtraction means coupled between said first and second signal channels for developing background representative signals corresponding to energy received within said relatively wide spectral band falling outside of said relatively narrow spectral band, means for subtractively combining said background representative signals with electrical signals in said first signal channel to effect a cancellation of background signal components appearing therein, means for subtractively combining said background representative signal with electrical signals in said second signal channel for effecting a cancellation of background signal components appearing therein, and means for combining the electrical signals passed through each of said signal combining means to produce an output signal representing target radiation substantially free of the effects of ambient background radiation.

References Cited in the file of this patent

UNITED STATES PATENTS

| | | |
|---|---|---|
| 2,489,223 | Herbold | Nov. 22, 1949 |
| 2,632,101 | Quarles | Mar. 17, 1953 |
| 2,794,926 | Watts et al. | June 4, 1957 |
| 2,843,757 | St. John | July 14, 1958 |
| 2,927,212 | Shimukonis et al. | Mar. 1, 1960 |
| 2,947,872 | Carbonara | Aug. 2, 1960 |
| 2,978,577 | Ketchledge | Apr. 4, 1961 |

FOREIGN PATENTS

| | | |
|---|---|---|
| 540,233 | Great Britain | Oct. 9, 1941 |